May 27, 1924.

B. PERCICH

AIR PUMP FOR MOTOR VEHICLES

Filed Aug. 18, 1923   2 Sheets-Sheet 1

1,495,923

Inventor
Ben Percich
By Francis L. Maguire
Attorney

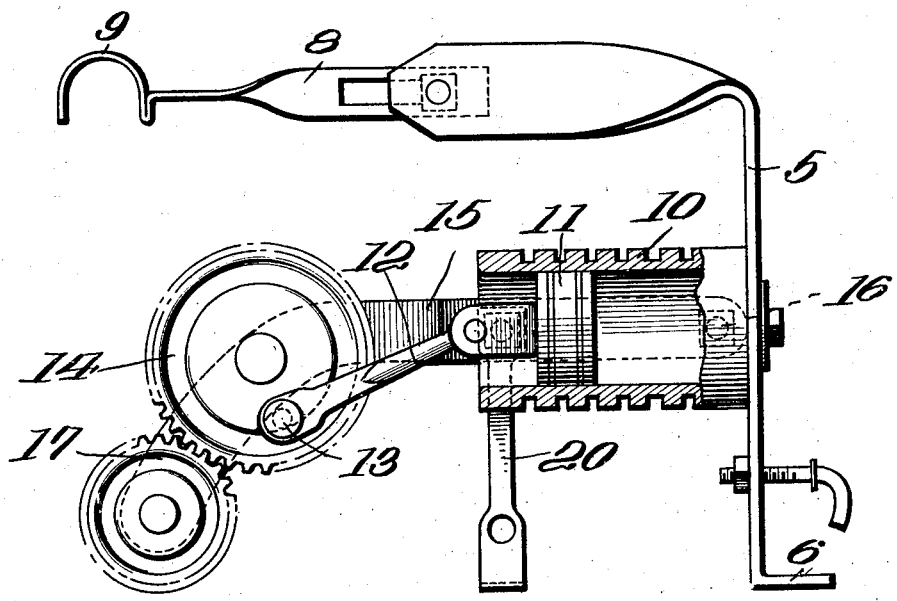
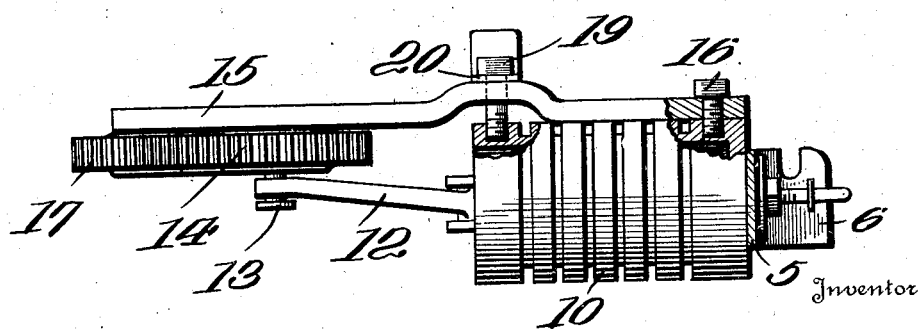

Patented May 27, 1924.

1,495,923

UNITED STATES PATENT OFFICE.

BEN PERCICH, OF WARREN, OHIO, ASSIGNOR OF ONE-HALF TO THEODORE H. GRIMM, OF WARREN, OHIO.

AIR PUMP FOR MOTOR VEHICLES.

Application filed August 18, 1923. Serial No. 658,062.

*To all whom it may concern:*

Be it known that I, BEN PERCICH, of Warren, in the county of Trumbull and State of Ohio, have invented certain new and useful Improvements in Air Pumps for Motor Vehicles; and I do hereby declare the following to be a full, clear, and exact description of the invention, such as will enable others skilled in the art to which it appertains to make and use the same.

This invention is directed to improvements in tire pumps adapted for attachment to an automobile motor so that the power of said motor may be used for driving the pump without affecting the construction thereof.

The invention includes the provision of a special type of bracket adapted to be secured upon one of the sills at the forward end of the chassis frame or directly to an automobile motor at one side thereof, particularly the Ford type of motor, there being mounted a pump cylinder having a reciprocating piston connected with a crank carried by an arm pivoted to the bracket and having a geared connection with the fan driving pulley mounted on the forward end of the crank shaft.

The invention further includes means for holding the driving connection in positive engagement with the fan driving pulley or for holding it in inoperative position as desired, and the pump carrying bracket is made adjustable in order to compensate for slight differences in the motor construction.

Figure 1:
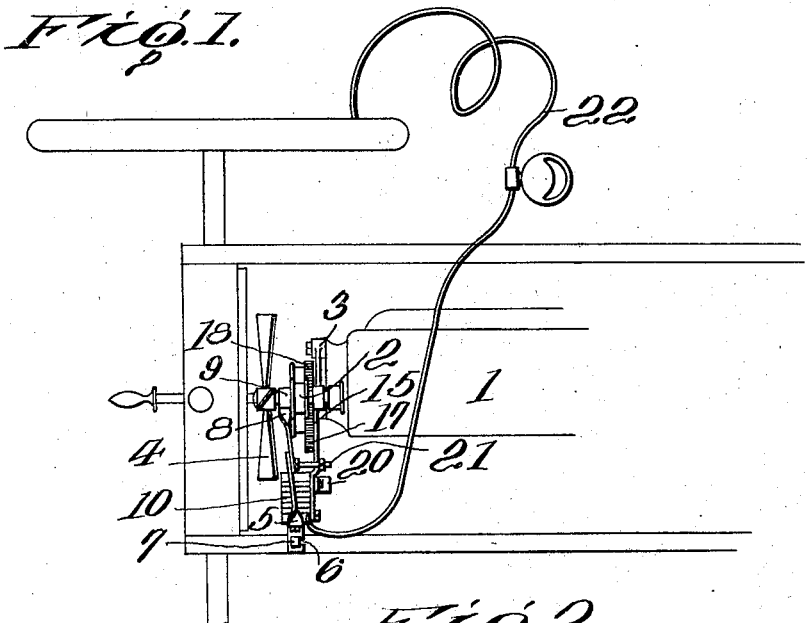
Figure 2:
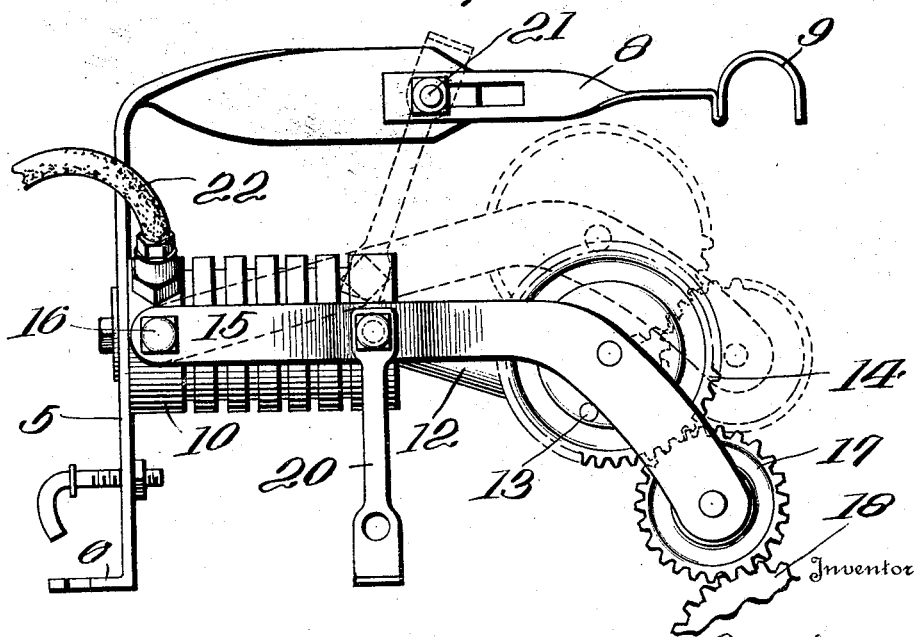

In the drawings, Figure 1 is a plan view showing the invention applied to an automobile. Figure 2 is a detailed elevation of the invention showing the gears in disengaged relation in dotted lines. Figure 3 is a view similar to Figure 2 with parts broken away of the opposite side thereof. Figure 4 is a plan view with parts broken away showing the manner of mounting the arm and cylinder on the bracket.

1 indicates the usual motor used in an automobile preferably of the Ford type which has the crank shaft projecting forwardly thereof to receive a fan driving pulley 2, above which is mounted a bracket 3 carrying the usual cooling fan 4.

A pump carrying bracket 5 is provided with a laterally extending foot 6 having bolt holes adapted to be secured to the bolts 7 carried by the chassis frame although it will be understood that in applying the invention to some types of motors the bolts which are used in the assemblage of the crank case may be employed as an attaching medium. The other end of the bracket is provided with an adjustable extension 8 having a U-shaped end portion 9 adapted to fit the fan carrying bracket 3 so as to rigidly secure the pump bracket to the engine. A pump cylinder 10 is rigidly mounted on the bracket 5 in which is the usual reciprocating pump piston 11 having a rod 12 connected with a crank 13 on the gear 14 rotatably mounted on an arm 15 pivotally connected to the pump cylinder as indicated at 16. The end of the arm 15 is provided with an idler gear 17 meshing with the gear 14 and also adapted to mesh with an annular gear 18 secured to the fan driving pulley 2 to supply power for driving the pump piston. A set screw 19 is provided in the arm for engagement with a recess in the pump cylinder for locking the arm with the gears in driving relation and a link 20 is pivotally connected with the arm 15 and adapted to hold the arm and the gears 14 and 17 in raised position, as shown in dotted lines in Figure 2 of the drawings, and disengaged from the annular gear carried by the fan pulley through the medium of a bolt 21 securing the link to the pump bracket 5. A hose 22 is used for conducting the air from the pump to the desired points of use, it being understood that suitable valve connections are provided in the pump cylinder as usual.

This pump may be readily attached to any automobile engine in use by securing the bracket to the chassis frame or motor as above described, after which the manipulation of the link and the set screw will permit the movement of the arm to either engage or disengage the idler gear from engagement with the annular gear carried by the fan driving pulley.

I claim as my invention:

1. In an air pump for automobiles, an L-shaped bracket one end being supported adjacent the cooling fan, an adjustable arm carried by the other end of said bracket and having a U-shaped formation at its end for attachment to the fan bracket or adjacent portion of the engine, means for clamping said adjustable arm in a predetermined position for rigidly attaching said bracket to the automobile, a pump cylinder carried by said bracket and having a piston, a pivoted arm carried by said pump cylinder, gears carried by said pivoted arm and having a driving connection with the piston, said arm being movable to establish a driving connection between said gears and a moving part of the automobile engine, means associated with said pivoted arm and engaging in said pump cylinder for holding said arm to maintain said gears in driving connection with said engine, and a link carried by said pivoted arm engageable with the clamping means of said bracket carried adjustable arm for holding said pivoted arm in position to maintain said gears out of driving connection with said engine.

2. In a motor vehicle engine operated air pump, a body portion, a supporting bracket for said body portion attachable to said vehicle adjacent the engine cooling fan, an adjustable brace carried by said bracket and engageable with a fixed portion of the engine, a movable arm, pump actuating means carried by said arm the latter being movable to establish a driving connection between said pump actuating means and a moving part of said engine, and means associated with said bracket and engageable with said movable arm for disconnecting said driving connection.

3. In a motor vehicle engine operated air pump, a body portion, a supporting bracket for said body portion attachable to said vehicle adjacent the engine cooling fan, an adjustable brace carried by said bracket and engageable with a fixed portion of the engine, a movable arm, pump actuating means carried by said arm the latter being movable to establish a driving connection between said pump actuating means and a moving part of said engine, means engageable with said arm and the body portion of said pump for maintaining a driving connection between said pump actuating means and a moving part of said engine, and means associated with said bracket and said last mentioned means for disconnecting the aforesaid driving connection.

4. In a motor vehicle engine operated air pump, a body portion, a supporting bracket for said body portion attachable to said vehicle adjacent the engine cooling fan, an adjustable brace carried by said bracket and engageable with a fixed portion of the engine, a movable arm, pump actuating means carried by said arm the latter being movable to establish a driving connection between said pump actuating means and a moving part of said engine, means engageable with said arm and the body portion of said pump for maintaining a driving connection between said pump actuating means and a moving part of said engine, and means associated with said bracket and said movable arm for disconnecting the aforesaid driving connection.

5. In a motor vehicle engine operated air pump, a body portion, a supporting bracket for said body portion attachable to said vehicle adjacent the engine cooling fan, a movable arm, pump actuating means carried by said arm the latter being movable to establish a driving connection between said pump actuating means and a moving part of said engine, means engageable with said arm and the body portion of said pump for maintaining a driving connection between said pump actuating means and a moving part of said engine, and means associated with said bracket and said movable arm for breaking the aforesaid driving connection.

6. In a motor vehicle engine operated air pump, a body portion, a supporting bracket for said body portion attachable to said vehicle adjacent the engine cooling fan, a movable arm, pump actuating means carried by said arm the latter being movable to establish a driving connection between said pump actuating means and a moving part of said engine, a stud carried by said movable arm engageable with the body portion of said pump for holding said arm in position to maintain a driving connection between said pump actuating means and said moving engine part, and a link carried by said stud having means for attachment to said bracket for breaking the aforesaid driving connection.

In testimony whereof I have signed this specification.

BEN PERCICH.